Patented June 28, 1949

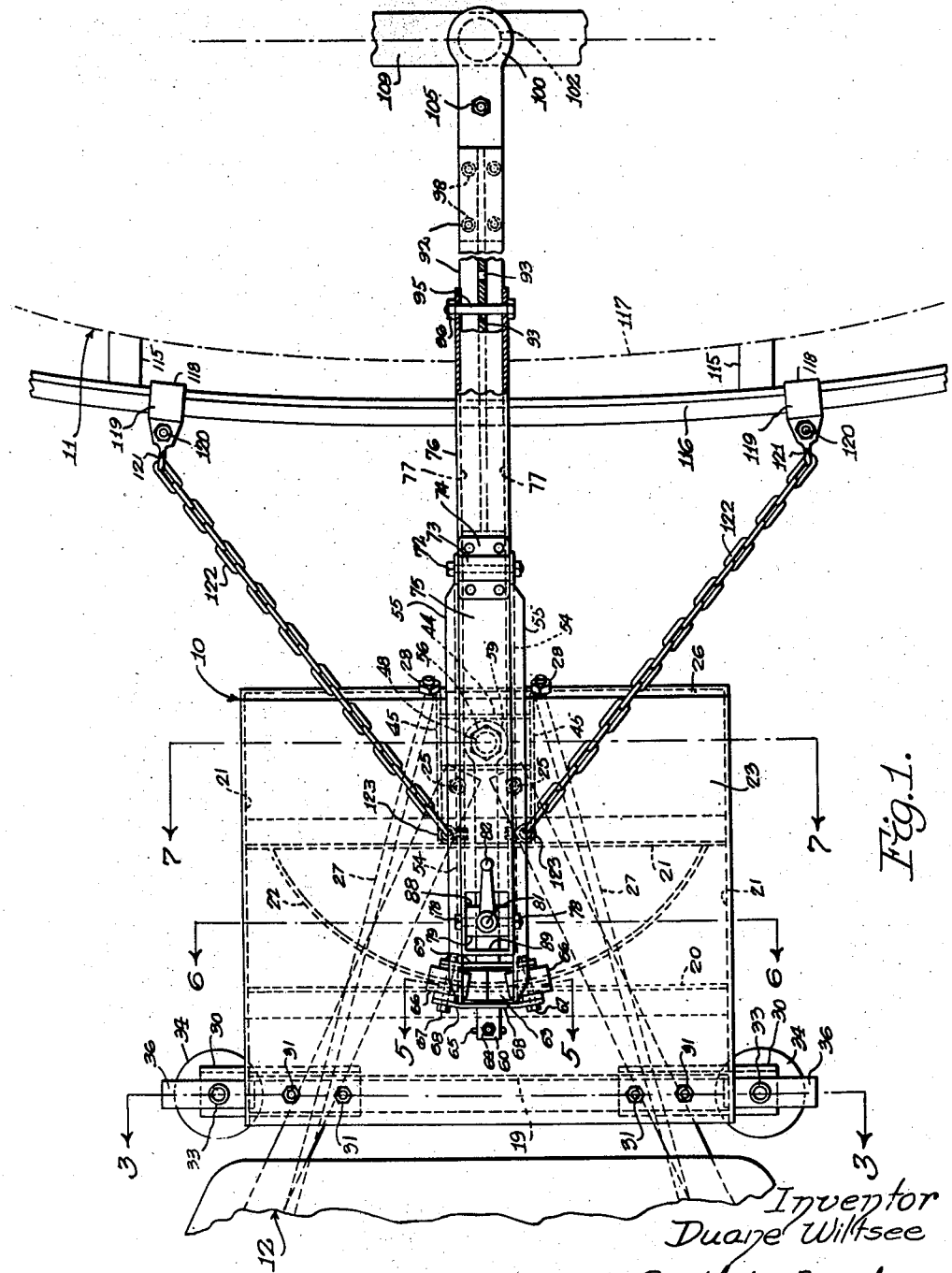

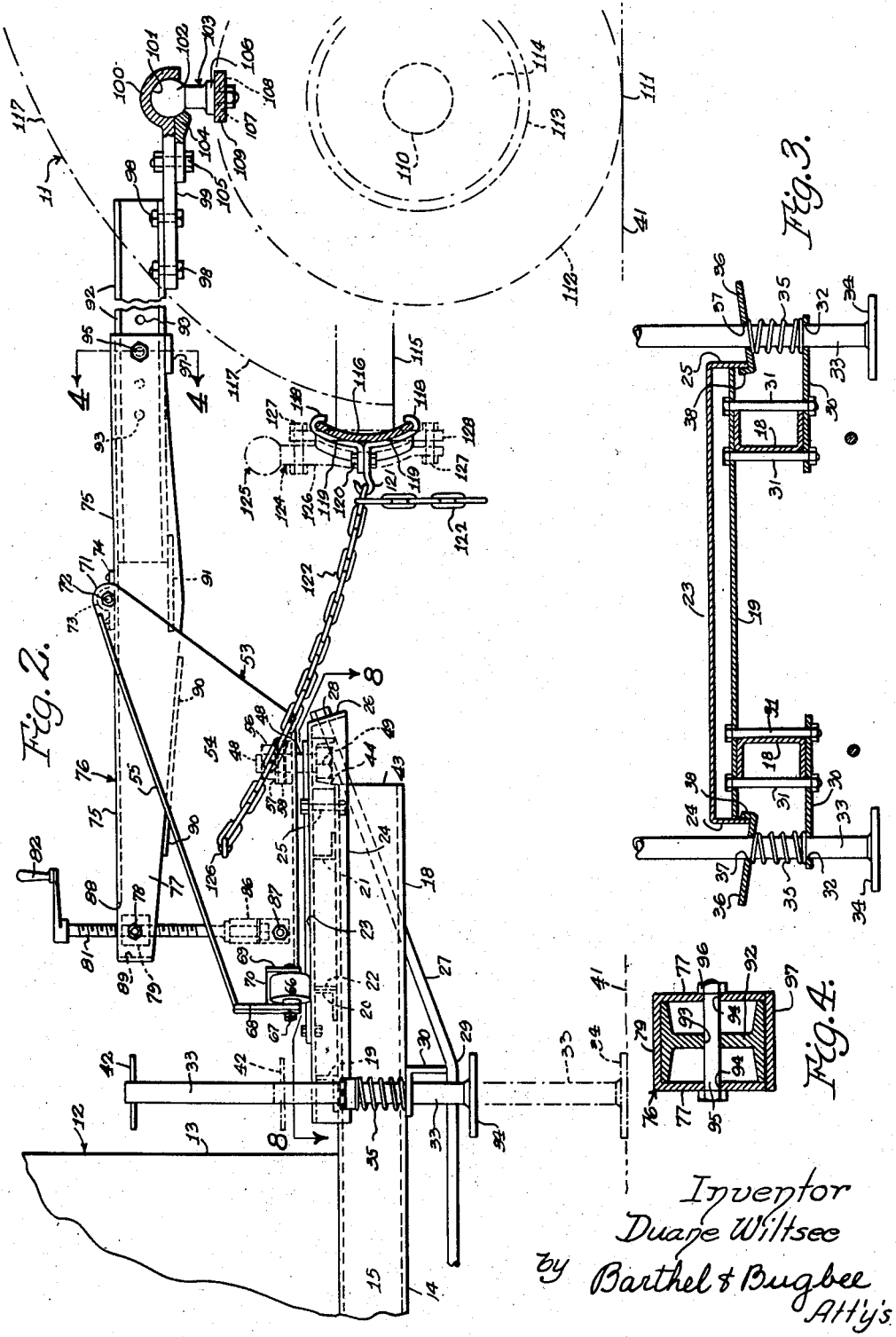

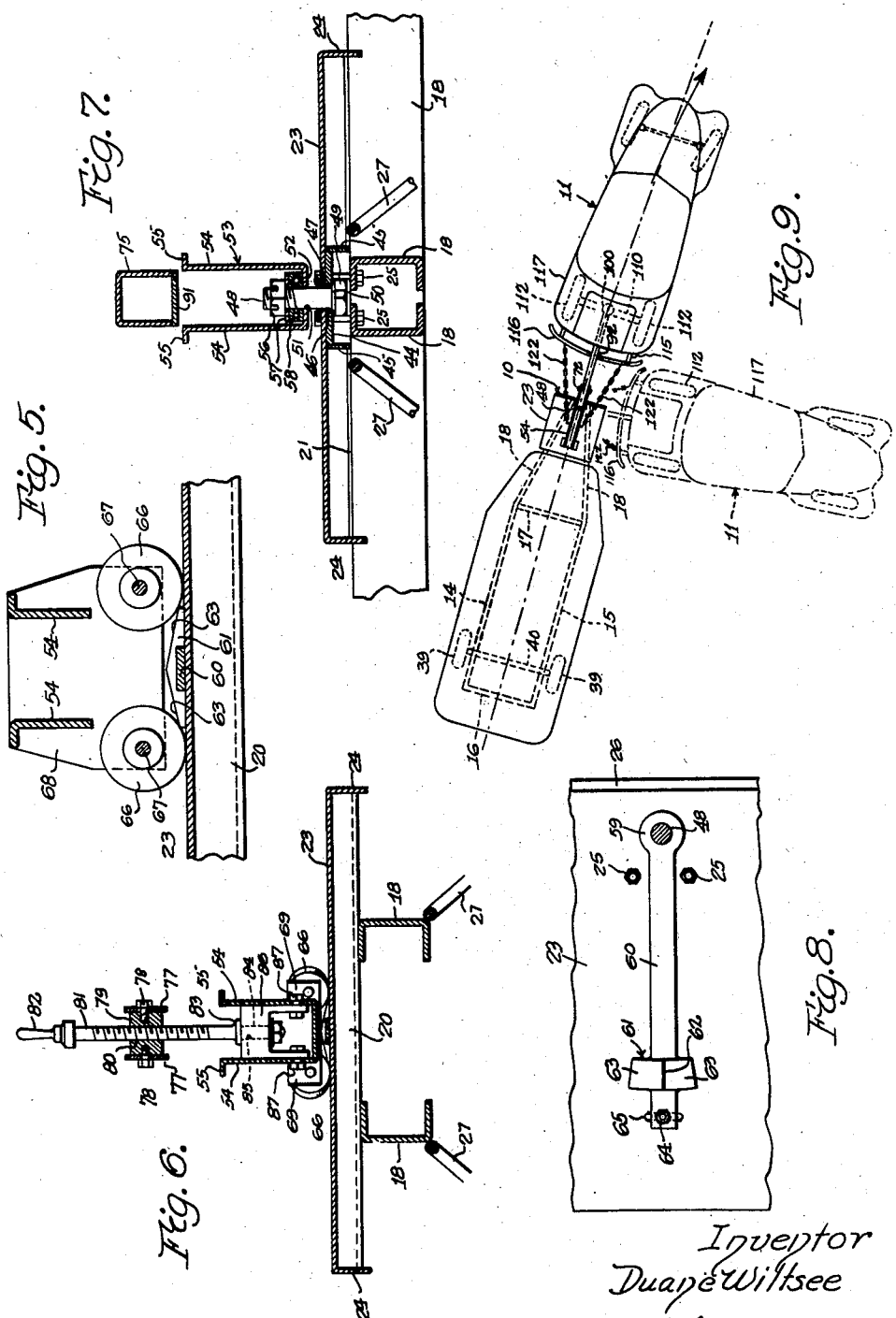

2,474,296

UNITED STATES PATENT OFFICE 2,474,296

TOWING DEVICE FOR TRAILERS

Duane Wiltsee, Ann Arbor, Mich.

Application January 4, 1946, Serial No. 638,985

19 Claims. (Cl. 280—33.44)

1

This invention relates to vehicles, and in particular to towing devices for trailers.

One object of this invention is to provide a towing device for trailers wherein steering of the towing car through small angles maintains the towing pivot of the trailer in the vicinity of the axle of the towing car, whereas steering thereof through large angles such as in turning a sharp corner, automatically shifts the towing pivot to a point rearwardly of the towing car axle, thereby preventing weaving of the trailer to and fro as the towing car is steered to avoid bumps, rocks, ruts or other defects in the road surface.

Another object is to provide a towing device for trailers wherein the forward portion of the trailer's weight is applied to the towing car in a plane through the contact points of the rear wheels with the roadway instead of being cantilevered behind the towing car, thereby increasing the tractive ability of the towing car and also supporting this weight directly over the rear axle in the best position for absorption by the towing car springs; also reducing the up-and-down movement of the pivot connection to a minimum and effectively preventing "nose diving" of the trailer in sharp depressions.

Another object is to provide a towing device for trailers wherein the ball pivot connection to which the trailer is fastened leads to the right when the towing car turns to the right, and to the left when the towing car turns to the left, and not vice versa.

Another object is to provide a towing device for trailers wherein a turning of the wheels through all turning radii above a predetermined amount occurs with the towing pivot located approximately over the rear axle of the towing car, whereas turning radii under this predetermined amount automatically shift the turning pivot rearwardly to another pivot point which is normally inoperative for large turning radii.

Another object is to provide a towing device for trailers as set forth in the preceding objects wherein an adjustment is provided to cause long or short trailers to track more efficiently with the towing car.

Another object is to provide a towing device for trailers wherein the towing connection consists of a special ball and socket arrangement which is movable to the right, to the left, upward or downward so as to make the coupling operation quick and easy.

Another object is to provide a towing device for trailers wherein the towing car serves as a

2 jack base when raising the front of the trailer to connect it to the towing car, thereby merely forcing the towing car springs downward until they carry the weight of the front end of the trailer.

Another object is to provide a towing device for trailers wherein the front of the trailer can be raised or lowered to make the trailer run level without changing the height of the ball and socket connection on the towing car.

Another object is to provide a towing device for trailers having a tongue which is adjustable lengthwise so as to adjust the towing car to the trailer, thereby permitting the shortest possible turn without interference between the towing car and the trailer.

Another object is to provide a towing device for trailers as set forth in the preceding object wherein the rearward pivot is automatically locked against operation and only the front pivot permitted to operate for large turning radii, yet which is automatically unlocked and permitted to operate when the turning radius becomes shorter than a predetermined turning radius.

Another object is to provide a towing device for trailers, especially freight trailers, wherein means is provided for adjusting the towing connection through a wide range of heights above the ground, whereby the trailer may be connected at a low point on a farm tractor or at a high point on a wagon or motor truck.

Other objects and advantages of the invention will become apparent during the course of the following description of the accompanying drawings, wherein:

Figure 1 is a top plan view, partly in section, of a towing device for trailers according to a preferred embodiment of the invention;

Figure 2 is a side elevation, partly in section, of the towing device shown in Figure 1;

Figure 3 is a cross-section along the line 3—3 in Figure 1, showing the supporting device for the forward end of the trailer in operation;

Figure 4 is a cross-section along the line 4—4 in Figure 2;

Figure 5 is an enlarged fragmentary cross-section adjacent the rearward locking cam, taken along the line 5—5 in Figure 1;

Figure 6 is a cross-section through the height-adjusting mechanism of the towing device, taken along the line 6—6 in Figure 1;

Figure 7 is a cross-section through the rearward pivot point of the towing device, taken along the line 7—7 in Figure 1;

Figure 8 is a fragmentary horizontal section immediately above the rearward pivot locking device taken along the line 8—8 in Figure 2; and Figure 9 is a diagrammatic top plan view showing the relative positions of the towing car and trailer for large and small turning radii respectively.

Referring to the drawings in detail, Figures 1 and 2 show a preferred embodiment of the trailer towing device of the present invention, generally designated 10 as applied to a towing car, generally designated 11, and a trailer, generally designated 12. The trailer 12 is provided with a body 13 supported upon a frame 14 consisting of opposed channel members 15 (Figure 9) interconnected at the rearward end by a cross member 16 and near the forward end by a cross member 17. Forwardly of the cross member 17, the channel members 15 are bent toward one another in portions 18 which at their forward portions are interconnected by cross members 19, 20 and 21 (Figure 2) of angle cross section. The cross members 20 and 21 are interconnected by an arcuate member 22 extending from one to the other and preferably welded in position.

Mounted on the cross members 19, 20, 21 and 22 and supported thereby is a base plate 23 having angled edge flanges 24 (Figure 3). The plate 23 is also secured to the forward end of the channel member portions 18 by bolts 25 (Figure 7). The forward end of the base plate 23 is provided with a downwardly angled flange 26 (Figure 2) at which tie rods 27 from the trailer 12 are anchored, as by the nuts 28 threaded thereon. The tie rods 27 are intermediately bent as at 29 and supported at this bending point by the vertical flanges of angle members 30, the upper flanges of which are secured to the channel member portions 18 (Figure 2) by tie bolts 31 (Figure 3) extending through the lower flange of the cross member 19.

Passing through apertures 32 in the upper flanges of the angle members 30 are vertically slidable supporting legs or jacks 33 terminating at their lower ends in pads 34. Surrounding the supporting legs 33 are coil springs 35 having their lower ends engaging the upper flanges of the angle members 30 and their upper ends upwardly urging locking members 36. The latter are in the form of bars having enlarged apertures 37 therethrough for the passage of the legs 33. The inner ends 38 of the locking members 36 are angled upward to engage the lower edges of the side flanges 24 of the plate 23.

As a consequence of the enlarged holes 37 being somewhat greater in diameter than the diameter of the legs 33, the locking members 36 occupy slightly tilted positions (Figure 3) when they are carrying the weight of the upwardly-retracted legs 33, by the engagement of the bent end 38 with the lower edges of the flanges 24. Meanwhile, the weight of the rearward end of the trailer 12 is supported by the usual wheels 39 and axle 40 (Figure 9). The parts of the trailer 12 rearward of the legs 33 are conventional and form no part of the present invention.

When the trailer 12 is connected to the towing car 11 through the towing device 10, as in Figures 2 and 3, the legs 33 may be dropped until the pads 34 rest upon the surface of the ground 41, as shown by the chain lines in Figure 2, merely by pushing downward upon the outer ends of the locking members 36 (Figure 3), compressing the springs 35 and enabling the legs 33 to drop through the enlarged holes 37. Handles 42 in the form of cross-bars through the upper ends of the legs 33 (Figure 2) facilitate the raising and lowering of the legs 33.

Mounted beneath the plate 23 with one flange resting upon and bridging the upper flanges of the channel member portions 18 at their forward ends 43 is a downwardly positioned channel cross-member 44 (Figure 2), the ends of its flanges being interconnected with the vertical flange of the cross member 21 and the front flange 26 of the base plate 23 by longitudinal bars or plates 45 (Figure 1), the assembly being united in any suitable way, as by welding. The channel cross member 44 is provided with an aperture 46 (Figure 7) in its web aligned with a similar aperture 47 in the base plate 23, these apertures serving to receive a stub shaft or rearward pivot member 48 in the form of a large bolt having a head 49 beneath the web of the channel cross member 44 and a slightly rounded portion 50 joining it with the shank, which is of somewhat smaller diameter than the apertures 46 and 47 so as to provide a loose fit therebetween. This loose fit permits the bolt 48 to possess a limited self-aligning quality.

The upper end of the bolt 48 passes through an aperture 51 in the web 52 of an upwardly directed channel member or towing member carrier 53, the sides 54 of which are of roughly triangular shape (Figure 2) and are provided with narrow flanges 55 along their upwardly inclined upper edges. The upper end of the bolt 48 is threaded to receive a castellated nut 56 (Figure 7) beneath which is a washer 57 and ball thrust bearing 58. Encircling the shank of the bolt 48 is the eye 59 (Figure 8) of a rearwardly extending arm 60 carrying a roof-shaped cam member 61 with a ridge 62 and inclined side surfaces 63 sloping downwardly therefrom. The rearward end of the arm 60 is provided with a locking bolt 64 passing therethrough and through an elongated transverse slot 65 which is slightly arcuate with its center at the center of the stub shaft or pivot bolt 48. By loosening the bolt 64, the ridge 62 of the cam 61 may be moved laterally a slight distance in either direction for adjustment purposes, after which it may be locked in this position by tightening the bolt 64.

Riding on the upper surface of the base plate 23 (Figures 2, 5 and 6) at opposite ends of the inclined surfaces 63 of the cam 61 are small wheels or rollers 66. The rollers 66 are rotatably mounted upon axles 67 supported by approximately parallel plates 68 and 69 (Figure 1), the ends of which are bent so that the axles 67 are radial to the arcuate member 22 (Figure 1) which has its center of curvature located in the axis of the pivot bolt or stub shaft 48. The plate 68 is secured to the rearward ends of the sides 54 of the channel member 53, whereas the plates 69 are secured to the forward edges of approximately square cutout portions 70 formed in the lower end portions of the sides 54 (Figure 2). As described more fully in connection with the operation of the invention, the rollers 66 and the cam member 61 constitute a restraining device for normally preventing the trailer device 11 from pivoting around the rearward pivot member 48 for long turning radii. This restraining device yields automatically to permit pivoting around the rearward pivot member 48 when sharp turns of short radii are made.

The upper forward ends 71 of the channel member 53 are bored to receive a horizontal pivot bolt 72, the shank of which is secured within the U-shaped portion 73 of a bracket 74 (Figure 1)

bolted or riveted to the web 75 of a towing member including a downwardly directed channel member 76 having sides 77. Secured to the channel member 76 between the sides 77 thereof (Figure 6) as by the bolts 78, is a block 79 having a threaded vertical bore 80 therethrough. The latter threadedly receives a screw shaft 81, the upper end of which carries a hand crank 82. The lower end of the screw shaft 81 is flanged as at 83 beneath which it is provided with a reduced diameter portion 84 passing through a smooth bore 85 in a U-shaped bridge member 86, the arms of which are bolted as at 87 to the sides 54 of the channel member 53. The web 75 of the channel member 76 is cut away (Figures 1 and 2) to provide a rectangular aperture 88 for free passage of the screw shaft 81 and tilting of the block 79 around the bolts 78. Similarly, the bridge member 86 may tilt around the bolts 87. The rearward ends of the sides 77 are interconnected by a plate 89 secured thereto as by welding. Accordingly, when the crank 82 is turned, the foregoing mechanism raises or lowers the rearward end of the channel member 76 around the pivot bolt 72, thereby enabling the trailer 12 to be towed in a horizontal position regardless of the height of the connection on the towing car.

The lower edges of the sides 77 of the channel member 76 are interconnected by a plate 90 (Figure 2) and at an intermediate point beneath the pivot bolt 72 are interconnected by a horizontal plate 91, both plates being preferably secured thereto as by welding. Slidably received between the sides 77 of the channel member 76 and between the web 75 and plate 91 thereof is an elongated member 92 of I-beam cross-section (Figure 4) having horizontally spaced holes 93 therethrough. The forward end of the channel member 76 is provided with holes 94 aligned therewith and serving to receive a clamping bolt 95 passing therethrough and secured thereto by a nut 96. A plate 97 interconnects the sides 77 immediately beneath the bolt 95 and is secured thereto as by welding.

Bolted as at 98 to the lower flanges of the elongated member 92 (Figure 2) is a towing bar 99 having a cupped portion 100 at its forward end. The cupped portion 100 contains a spherical cavity 101 serving as a socket for the ball head 102 of a forward pivot member 103, the ball head 102 being retained in the socket 101 by a retaining member or latch 104 bolted as at 105 to the towing bar 99. The lower portion of the pivot member 103 is flanged as at 106 and beneath this is provided with a reduced diameter threaded portion 107 passing through an aperture 108 in a cross member 109 (Figures 1 and 2). The latter is secured by any suitable means (not shown) to the towing car 11 in a position as nearly as possible immediately above the rear axle 110 of the towing car 11 and approximately in a vertical plane through the contact point 111 of the tires 112 with the ground level 41. The tires 112 are mounted upon the usual rims 113 of wheels 114 mounted upon the rear axle 110.

The towing car 11 is provided with bumper brackets 115 secured thereto in any suitable way (not shown) depending upon the particular car and carrying a bumper 116. The car body 117 at its rearward end closely approaches the bumper 116 but the rear compartment is provided with the usual cover or lid (not shown) which may be raised to admit the towing bar 99 and its associated mechanism. Engaging the bumper 116 and having their ends 118 hooked over the upper and lower edges thereof are bumper clamps or chain anchorages 119 interconnected by bolts 120, the lower clamps 119 being provided with rearwardly extending hooks 121 (Figure 2). These hooks 121 are engaged by any convenient link of a pair of chains 122, the opposite ends of which are secured to eye bolts 123 mounted on and extending through the sides 54 of the channel member 53. The chains 122 are adjusted to possess a slight amount of slack for a purpose described in connection with the operation hereof. Optionally, mountable upon the midportion of the bumper 116, and shown by the chain lines in Figure 2, is an auxiliary pivot member generally designated 124 and consisting of a ball head 125 of the same diameter as the ball head 102. Beneath the ball head 125, the pivot member 124 is provided with a shank 126 bent to conform to the curvature or camber of the bumper 116 and secured thereto by bolts 127 which likewise pass through a backing plate 128 engaging the inner or opposite side of the bumper 116. By tightening the bolts 127, the pivot member 124 is rigidly clamped to the midportion of the bumper 116 and the ball head 125 thereof serves optionally to receive the socket 101 of the towing bar 119 in the event that it is not feasible to employ a pivot member 103 mounted within the body 117 of the towing car 11.

*Operation*

In the operation of the invention, let it be assumed that the trailer 12 is separated from the towing car 11 and supported by the jacks 33, which are in their lowered or chain-line position shown in Figure 2. Let it also be assumed that the towing car has been provided with a suitable forward pivot member 103, preferably mounted on a cross-member 109 installed within the rear compartment as nearly over the rear axle as it is possible to do. Let it finally be assumed that the chain anchorages 119 have been secured to the rear bumper 116, as shown in Figure 1. The I-beam member 92 is also adjusted in or out of the channel member 76 until the shortest possible distance will separate the trailer 12 and towing car 11 without the one interfering with the other during travel.

The trailer is prepared for hitching by operating the screw shaft 81 by the hand crank 82 in order to raise or lower the channel member 76 so that its cupped portion 100 in the towing bar 99 is higher than the ball head 102 on the pivot member 103 mounted on the towing car 11. The latter is then backed into position until the pivot member 103 is beneath the cupped portion 100, this locating being facilitated by further raising or lowering the channel member 76 by means of the hand crank 82 and also by swinging it horizontally around the pivot bolt 48. By this means, the hitching of the trailer is made a simple operation, regardless of the loading of the trailer or towing car or of the uneven nature of the ground. When the towing bar 99 and pivot member 103 have been properly positioned so that the ball head 102 enters the socket 101, the retaining member or latch 104 is swung into position beneath the head 102 and the bolt 105 tightened (Figure 2) to lock these parts together.

The chains 102 are now attached to the chain anchorages 119 by hooking one of the links thereof into each hook 129 such that the chains 122 are slightly slack. The hand crank 82 and screw shaft 81 may now be operated to raise the legs or jacks 33 off the ground, thereby transferring the weight of the forward end of the trailer 12 from the jacks 33 to the pivot member 103 over the rear axle of the towing car so as to be sustained by the springs of the latter. The crank 82 is operated one way or the other until the trailer 12 is in a level-running position. In the position just before starting, the rollers 66 lie on opposite sides of the cam member 61, as shown in Figures 5 and 6.

The towing car 11 may then be started and the journey commenced. As the towing car 11 is steered through slight turns, as shown in the solid line position in Figure 9, the trailer 12 pivots around the forward pivot member 103 over the rear axle 110 of the towing car and the rear pivot member 48 is releasably and yieldably restrained against moving out of its straight ahead position by the resistance of the inclined portions 63 of the cam member 61 to sidewise travel of the rollers 66. The slack in the chains 122 permits this normal pivoting to take place around the forward pivot member 103 for any desired and predetermined long turning radius, say a 200 foot radius. The latter radius may be shortened or lengthened by adjusting the chains 122 to possess more or less slack. If the center line of the trailer 12 is not exactly following the center line of the towing car 11, this can be corrected by shifting the cam 61 to one side or the other by loosening the locking bolts 64 and tightening it in a new position.

When the towing car 11 is required to make a sharp turn of shorter radius, for example, a turn of less than 200 foot radius, the chain 122 on the side opposite the direction in which the car is turning becomes taut and pulls the channel member 76 in that direction around the pivot bolt 48, causing the wheel 66 on the opposite side to climb up the inclined portion 63 of the cam 61 over the crest thereof and down the opposite inclined portion 63. The pivotal action now shifts from the forward pivot member 103 to the rearward pivot member 48. This occurs, for example, when the car 11 occupies the chain line position shown in Figure 9.

When the towing car 11 turns back again after the sharp curve has been passed, and the trailer 12 and car 11 again fall into line, the wheel 63 is pulled back over the cam 61 by the opposite chain 122, swinging the channel member 76 back to its normal running position, and transferring the pivot action from the rearward pivot member 48, which is now temporarily restrained from pivoting action by the cam 61, to the forward pivot member 103. This action repeats itself when sharp curves are encountered, but as these are infrequently met with, the normal running of the car and the normal towing action takes place around the forward pivot 103, which is most ideally located for efficient towing action, for the reasons previously explained.

Thus, during the journey, the normal towing from the forward pivot point prevents the weaving back and forth across the road which occurs when the towing pivot is located behind the rear axle on the towing car, as in prior art towing arrangements. The load is carried on top of the towing car frame and supported by the springs thereof, instead of being cantilevered behind the towing car, as has frequently occurred hitherto. In this manner, the up-and-down motion of the forward pivot member 103 is minimized and the trailer does not "nose-dive" when sharp ruts or depressions in the road are encountered. The normal carrying of the trailer's weight over the driving wheels of the towing car, moreover, provides additional tractive effort for pulling the trailer. The forward pivot member leads to the right when the tow car turns to the right and to the left when the tow car turns to the left, due to the position of the forward pivot member 103 over the rear axle, and not vice versa, as in towing devices where the towing pivot is located rearwardly thereof. At the same time, however, the device automatically adjusts itself and shifts to employ the rear pivot when a sharp turn is encountered and immediately shifts back to the forward pivot again when the sharp turn has been passed. The invention also permits heavy loading of the rear wheels of the towing car for maximum traction in an emergency.

When the journey has terminated, and it is desired to separate the towing car from the trailer, the latter is maneuvered into a level position and the jacks 33 are dropped to the ground 41 by lifting the locking members 36 (Figure 3). The latter, when released, grip the jacks 33 with a tight grip when the weight of the trailer 12 is transferred from the pivot member 103 to the jacks 33 by operating the hand crank 82 and screw shaft 81 to lift the socket 101 in the towing bar 99 off the ball head 102, the latch 104 having been slipped to one side to permit this. The chains 122 are then unhooked from the hooks 121 whereupon the towing car 11 is free to move away and be used independently of the trailer 12.

Where conditions do not permit the use of the pivot member 103 within the rear compartment of the towing car 11, in the ideal position thereof over the rear axle, 110, the auxiliary pivot member 124 attached to the bumper 116 may be used, as shown in the chain lines in Figure 2. This arrangement is less preferable, however, for reasons stated above.

Thus the ball head 102 and socket 101 constitute a forward pivot member and the base plate 23 serves as a support for the stub shaft 48 which constitutes a rearward pivot member. The towing member carrier 53, towing member 76, elongated member 92 of I-beam cross-section and towing bar 99 with their associated parts constitute a towing structure pivotally mounted on the rearward pivot member 48 and pivotally connectable to the forward pivot member 102, according to the terminology employed in the accompanying claims. The cam 61 with its inclined surfaces 63 and the spaced rollers 66 engaging it constitute a releasable locking device for yieldably locking the rearward pivot member 48 in its straight-ahead position.

While I have shown and described my invention in detail, it is to be understood that the same is to be limited only by the appended claims, for many changes made be made without departing from the spirit and scope of my invention.

What I claim is:

1. A towing device for connecting a trailer to a forward pivot member on a towing vehicle, comprising a support attachable to the trailer, a rearward pivot member mounted on said support, a towing structure pivotally mounted on said rearward pivot member and pivotally connectable to said forward pivot member, mechanism for releasably restraining said rearward pivot member from pivoting operation during turning of the towing vehicle in excess of a predetermined turning radius, and devices responsive to a turning of said towing vehicle through less than said predetermined radius for rendering said forward pivot member ineffective for further pivoting operation while releasing said restraining mechanism to render said rearward pivot member effective for pivoting operation.

2. A towing device for connecting a trailer to a forward pivot member on a towing vehicle, comprising a support attachable to the trailer, a rearward pivot member mounted on said support, a towing structure pivotally mounted on said rearward pivot member and pivotally connectable to said forward pivot member, mechanism for releasably restraining said rearward pivot member from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said rearward pivot member effective for pivoting operation, and mechanism for raising and lowering the forward portion of said towing structure relatively to said forward pivot member.

3. A towing device for connecting a trailer to a forward pivot member on a towing vehicle, comprising a support attachable to the trailer, a rearward pivot member mounted on said support, a towing structure pivotally mounted on said rearward pivot member and pivotally connectable to said forward pivot member, mechanism for releasably restraining said rearward pivot member from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said rearward pivot member effective for pivoting operation, and mechanism on said towing structure for raising and lowering the forward portion thereof relatively to the portion thereof mounted on said rearward pivot member.

4. A towing device for connecting a trailer to a forward pivot member on a towing vehicle, comprising a support attachable to the trailer, a rearward pivot member mounted on said support, a towing structure pivotally mounted on said rearward pivot member and pivotally connectable to said forward pivot member, mechanism for releasably restraining said rearward pivot member from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said rearward pivot member effective for pivoting operation, and mechanism for adjustably altering the length of said towing structure.

5. A towing device for connecting a trailer to a forward pivot member on a towing vehicle, comprising a support attachable to the trailer, a rearward pivot member mounted on said support, a towing structure pivotally mounted on said rearward pivot member and pivotally connectable to said forward pivot member, mechanism for releasably restraining said rearward pivot member from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said rearward pivot member effective for pivoting operation, and mechanism for releasably supporting the forward end of the trailer relatively to the ground.

6. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, mechanism for releasably restraining said carrier from pivoting operation during turning of the towing vehicle in excess of a predetermined turning radius, and devices responsive to a turning of said towing vehicle through less than said predetermined radius for rendering said forward pivot member ineffective for further pivoting operation while releasing said restraining mechanism to render said carrier effective for pivoting motion around said rearward pivot member.

7. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, mechanism for releasably restraining said carrier from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said carrier effective for pivoting motion around said rearward pivot member, said towing member being movably mounted on said carrier, and mechanism for raising and lowering the forward portion of said towing member relatively to said carrier.

8. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, mechanism for releasably restraining said carrier from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said carrier effective for pivoting motion around said rearward pivot member, said towing member being movably mounted on said carrier, and mechanism for swinging said towing member around the pivotal mounting thereof on said carrier whereby to raise and lower the forward end of said towing member relatively to said forward pivot member.

9. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, mechanism for releasably restraining said carrier from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said carrier effective for pivoting motion around said rearward pivot member, said towing member being movably mounted on said carrier, and mechanism interconnecting said towing member and said carrier for swinging said towing member around the pivotal mounting thereof on said carrier whereby to raise and lower the forward end of said towing member relatively to said forward pivot member.

10. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, mechanism for releasably restraining said carrier from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said carrier effective for pivoting motion around said rearward pivot member, and mechanism for adjustably altering the length of said towing member.

11. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, mechanism for releasably restraining said carrier from pivoting operation during turning of the towing vehicle in excess of a predetermined turning radius, devices responsive to a turning of said towing vehicle through less than said predetermined radius for rendering said forward pivot member ineffective for further pivoting operation while releasing said restraining mechanism to render said carrier effective for pivoting motion around said rearward pivot member, and mechanism for releasably supporting the forward end of the trailer relatively to the ground.

12. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, a restraining device disposed between said carrier and said support remote from said rearward pivot member, and devices connecting said towing structure with the towing vehicle remote from said forward pivot member, said connecting devices being responsive to a turning of the towing vehicle through less than a predetermined radius for rendering said forward pivot member ineffective for further pivoting operation while releasing said restraining device to render said carrier effective for pivoting motion around said rearward pivot member.

13. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, a restraining device disposed between said carrier and said support remote from said rearward pivot member, and devices connecting said towing structure with the towing vehicle remote from said forward pivot member, said connecting devices being responsive to a turning of the towing vehicle through less than a predetermined radius for rendering said forward pivot member ineffective for further pivoting operation while releasing said restraining device to render said carrier effective for pivoting motion around said rearward pivot member, said locking device comprising a cam and follower mechanism normally opposing relative motion thereof and operative to move relatively to one another in response to the action of said connecting devices.

14. A towing device for connecting a trailer to a forward pivot member on a towing vehicle, comprising a support attachable to the trailer, a rearward pivot member mounted on said support, a towing structure including a towing member carrier pivotally mounted on said rearward pivot member and towing member mounted on said carrier and pivotally connectable to said forward pivot member, a cam and follower restraining mechanism disposed between said carrier and said support remote from said rearward pivot member, and devices connecting said towing structure with the towing vehicle remote from said forward pivot member, said connecting devices being responsive to a turning of the towing vehicle through less than a predetermined radius for rendering said forward pivot member ineffective for further pivoting operation while effecting relative motion between said cam and follower mechanism to render said carrier effective for pivoting motion around said rearward pivot member.

15. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, a restraining device disposed between said carrier and said support remote from said rearward pivot member, and devices connecting said towing structure with the towing vehicle remote from said forward pivot member, said connecting devices being responsive to a turning of the towing vehicle through less than a predetermined radius for rendering said forward pivot member ineffective for further pivoting operation while releasing said restraining device to render said carrier effective for pivoting motion around said rearward pivot member, said connecting devices comprising flexible members with their rearward portions secured to said towing structure and their forward portions secured to the towing vehicle.

16. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, a restraining device disposed between said carrier and said support remote from said rearward pivot member, and devices connecting said towing structure with the towing vehicle remote from said forward pivot member, said connecting devices being responsive to a turning of the towing vehicle through less than a predetermined radius for rendering said forward pivot member ineffective for further pivoting operation while releasing said restraining device to render said carrier effective for pivoting motion around said rearward pivot member, said connecting devices comprising flexible members with their rearward portions secured to said towing structure and their forward portions secured to the towing vehicle at locations displaced transversely relatively to said forward pivot member.

17. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, a restraining device disposed between said carrier and said support remote from said rearward pivot member, devices connecting said towing structure with the towing vehicle remote from said forward pivot member, said connecting devices being responsive to a turning of the towing vehicle through less than a predetermined radius for rendering said forward pivot member ineffective for further pivoting operation while releasing said restraining device to render said carrier effective for pivoting motion around said rearward pivot member, and mechanism for raising and lowering the forward portion of said towing member relatively to said carrier.

18. A towing device for connecting a trailer to a forward pivot member on a towing vehicle, comprising a support attachable to the trailer, a rearward pivot member mounted on said support, a towing structure including a towing member carrier pivotally mounted on said rearward pivot member and a towing member mounted on said carrier and pivotally connectable to said forward pivot member, a restraining device disposed between said carrier and said support remote from said rearward pivot member, devices connecting said towing structure with the towing vehicle remote from said forward pivot member, said connecting devices being responsive to a turning of the towing vehicle through less than a predetermined radius for rendering said forward pivot member ineffective for further pivoting operation while releasing said restraining device to render said carrier effective for pivoting motion around said rearward pivot member, and mechanism for adjustably altering the length of said towing member.

19. A towing device for connecting a trailer to a forward pivot member on a towing vehicle, comprising a support attachable to the trailer, a rearward pivot member mounted on said support, a towing structure including a laterally swingable carrier member pivotally mounted on said rearward pivot member and having an arm extending rearwardly thereof, a towing member pivotally mounted on said carrier member and pivotally connectable to said forward pivot member, spaced rollers mounted on said arm in engagement with said support, an upwardly contoured cam member disposed between said rollers on said support, and flexible connectors secured between said carrier member and said towing vehicle transversely of said forward pivot member and responsive to a turning of the towing vehicle through less than a predetermined radius for swinging said carrier around said rearward pivot and forcing one of said rollers to clamp over said cam, whereby to release said carrier and towing member for pivoting motion around said rearward pivot member.

DUANE WILTSEE.

REFERENCES CITED

The following references are of record in the file of this patent:

UNITED STATES PATENTS

| Number | Name | Date |
| --- | --- | --- |
| 2,124,043 | Smith | July 19, 1938 |
| 2,162,481 | Fry | June 13, 1939 |
| 2,255,624 | Luse | Sept. 9, 1941 |
| 2,328,343 | Jacob | Aug. 31, 1943 |